United States Patent [19]
Hadden et al.

[11] 3,978,719
[45] Sept. 7, 1976

[54] TACHOMETER WITHOUT PHYSICAL CONNECTION TO INTERNAL COMBUSTION ENGINE

[75] Inventors: Stephen Clow Hadden, Cambridge; Leonard Robin Hulls, Marblehead; Patrick John Slaney, Cambridge, all of Mass.; Eldon Marvin Sutphin, Jr., Merrimack, N.H.

[73] Assignee: RCA Corporation, New York, N.Y.

[22] Filed: Apr. 30, 1975

[21] Appl. No.: 573,032

[52] U.S. Cl. ................................................ 73/115
[51] Int. Cl.² ........................................ G01M 15/00
[58] Field of Search ................... 73/116, 115, 506; 324/166, 168

[56] References Cited
UNITED STATES PATENTS

| | | | |
|---|---|---|---|
| 2,879,467 | 3/1959 | Stern | 73/506 |
| 3,059,480 | 10/1962 | Carpenter | 73/506 |
| 3,195,525 | 7/1965 | Beck | 73/506 |
| 3,574,475 | 4/1971 | Wolff | 73/506 |
| 3,731,533 | 5/1973 | Geery | 324/166 |
| 3,908,167 | 9/1975 | Hulls, et al. | 324/166 |

*Primary Examiner*—James J. Gill
*Assistant Examiner*—Anthony V. Ciarlante
*Attorney, Agent, or Firm*—Edward J. Norton; Carl V. Olson

[57] ABSTRACT

A tachometer includes a transducer for sensing pressure variations at the end of the exhaust pipe, or other easily-accessible point, due to explosions in an internal combustion engine. The transducer produces a corresponding electrical signal having a prominent selected frequency component which varies in frequency in direct proportion with engine speed. As the engine speed is increased and decreased, the electrical signal is passed through an amplifier with automatic gain control, and through a tracking filter to separate the prominent frequency component from other components. The separated component may be applied to a frequency-measuring device calibrated to display the revolutions per minute of the engine, or to a computer which computes and displays the result of an acceleration burst test.

8 Claims, 10 Drawing Figures

TACHOMETER WITHOUT PHYSICAL CONNECTION TO INTERNAL COMBUSTION ENGINE

BACKGROUND OF THE INVENTION

A tachometer for indicating the speed in revolutions per minute of an internal combustion engine normally consists of an instrument which is mechanically connected to and driven by the crankshaft or other rotating element in the engine. Another known type of tachometer consists of a magnetic pick-up positioned to generate an electrical pulse every time a notch on the engine vibration damper passes the pick-up. The electrical pulses per unit of time are easily translated to revolutions per minute. Yet enother tachometer picks up ignition pulses from the ignition system and translates the pulses to engine speed. These known tachometers all require a mechanical or electrical connection to an often inaccessible point on the engine, or require coupling to an ignition system which does not exist in compression-ignition diesel engines.

There is a need for a tachometer which can indicate engine speed without requiring the making of any mechanical or electrical-physical connection to the engine. Such a tachometer is particularly needed in conjunction with the full-load, full-speed testing of the power of internal combustion engines for diagnostic and maintenance purposes.

The full-load testing of internal combustion engines at maximum safe speed can be accomplished by connecting the engine to a dynamometer capable of absorbing the full-load output of the engine and capable of measuring the speed, torque and horsepower of the engine. Dynamometers are very large, very expensive, and very inconvenient to use.

A much more economical and convenient apparatus for testing spark-ignition internal combustion engines under simulated full-load conditions is apparatus for operating the engine with all but one of $n$ ignitions interrupted, where $n$ may be greater than the number of cylinders, so that all cylinders are operated in sequence under full power conditions. The engine operates at full speed driving frictional and pumping loads, without danger of overspeeding and damaging the engine.

An economical and convenient test of compression-ignition internal combustion engines under simulated full-load conditions is the acceleration burst test in which an engine initially operating at idle speed is suddenly given full throttle and caused to accelerate to a maximum governed speed. The inertia of the engine is the load on the engine, and the time taken to accelerate through a low speed to a high speed is a measure of the full-power, full-load condition of the engine. This test is particularly useful for testing diesel engines, and provides a somewhat less accurate indication of the condition of a spark ignition engine equipped with a carburetor instead of fuel injectors.

The acceleration burst test itself can be completed in about one second, once the speed-sensing tachometer and the computer are installed and connected. It is clear that the existing known methods of physically attaching a tachometer to an engine are relatively very time consuming and troublesome. It is therefore highly desirable to have a tachometer which is almost instantly operative without requiring any mechanical or electrical connection to the internal combustion engine.

SUMMARY OF THE INVENTION

A tachometer is provided which measures and indicates the changing speed of an internal combustion engine. Pressure variations produced by explosions in the cylinders of the engine are sensed, at a point such as at the end of the exhaust pipe, and are translated to a corresponding electrical signal having a prominent component which varies in frequency in direct proportion with engine speed. The prominent component in the electrical signal is selectively amplified by means including an automatic gain control circuit and a tracking filter, to produce a clean signal having a frequency accurately indicative of engine speed.

DESCRIPTION OF THE PREFERRED EMBODIMENT

Figure 1:
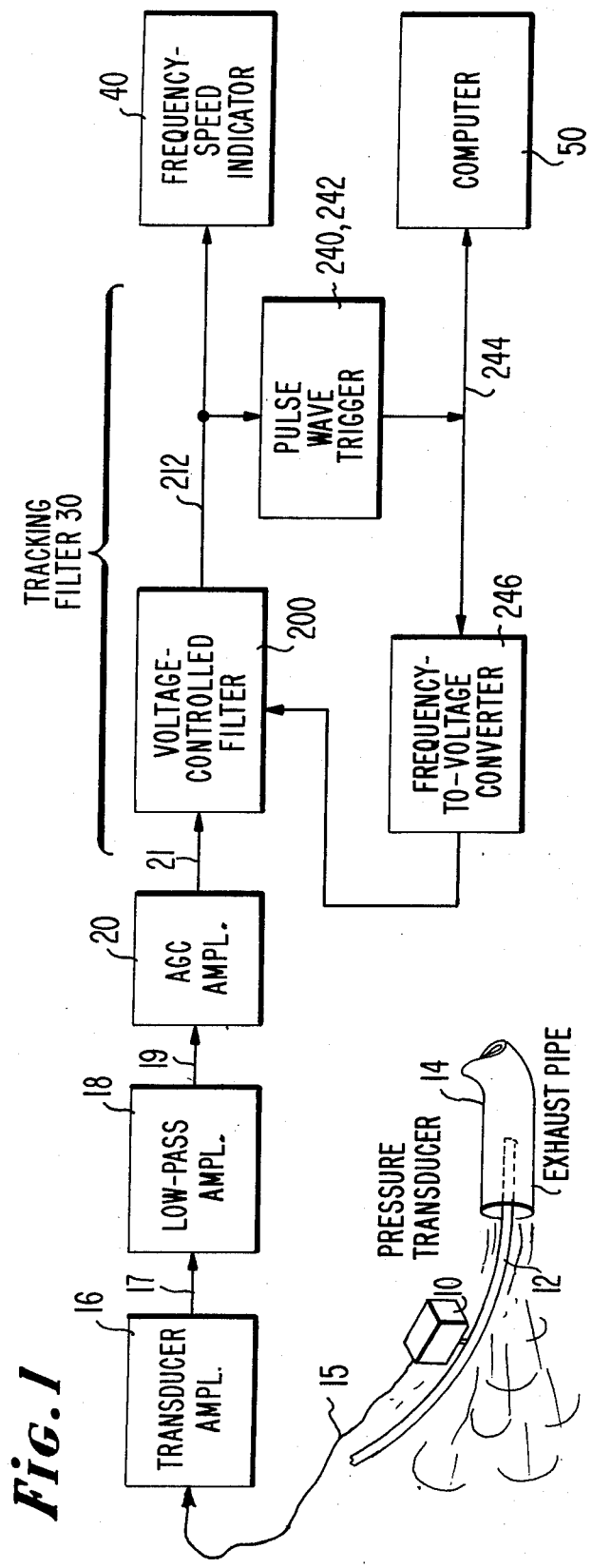
FIG. 1 shows a pressure transducer located at the end of the exhaust pipe of an internal combustion engine, and a block diagram of electronic apparatus for measuring and indicating the speed of the engine, and for computing the power of the engine during an acceleration burst test.

Referring now in greater detail to the drawing, FIG. 1 shows the overall tachometer system starting with a pressure transducer 10 which may be a variable-reluctance pressure transducer Model DP15 manufactured by Validyne Engineering Corporation of Northridge, Calif. 91324. The transducer responds to pressures ranging between −1 and +1 pounds per square inch. The transducer is mounted at the center of a metal tube 12 which is twenty inches long and one-half inch in inside diameter. The tube 12 is curved slightly to allow the pressure transducer 10 to be located out of the exhaust stream when the tube is inserted about three inches into the open end of the exhaust pipe 14 of the engine.

Figure 3:
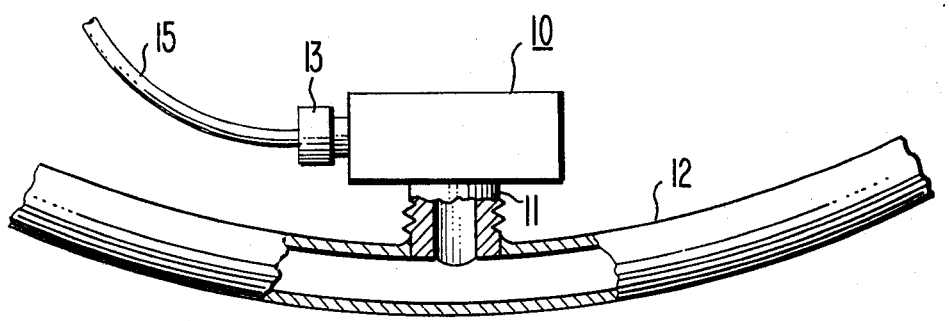
FIG. 3 is a variable reluctance pressure transducer assembly for insertion in the end of an exhaust pipe.

FIG. 3 shows the mechanical construction of the pressure transducer assembly. The metal tube 12 has a central transverse aperture in which a pipe fitting 11 is brazed. The fitting 11 is provided with male threads for the fastening thereon of the transducer unit 10 so that the pressure-sensing diaphragm in the transducer is in communication through the fitting 11 with the interior of tube 12. The transducer has an electrical connector at 13 for the cable 15.

According to an alternative mode of operation, the transducer tube 12 is inserted a short distance into the air intake of the engine. The system can operate on either the exhaust, the intake pressure, or the crankcase blow-by variations of an internal combustion engine.

The pressure transducer 10 is supplied with alternating-current excitation from a transducer amplifier 16 over a cable 15. The electrical signal having an amplitude varying with pressure, which is produced by the transducer 10, is applied in the reverse direction over cable 15 to the amplifier 16. The amplifier 16, which may be a Model CD12 transducer indicator manufactured by Validyne Engineering Corporation, together with transducer 10, responds to pressure variations having a frequency range from direct current to 1000 Hertz. The prominent fundamental speed-indicating frequency component in the exhaust of an engine ranges from 20 Hz at a low engine speed to 200 Hz at a high engine speed.

Figure 2:
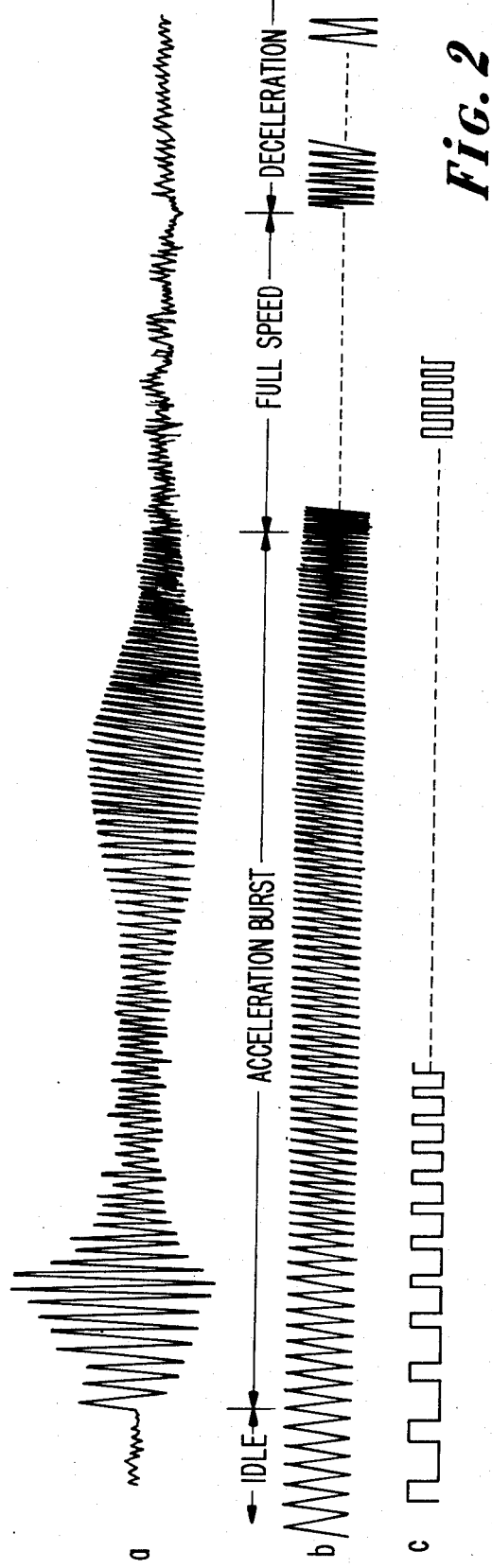
FIG. 2 is a chart of electrical signal waveforms in the system of FIG. 1 during the performance of an acceleration burst test.

FIG. 2a shows the electrical signal produced by transducer 10 and amplifier 16 during the performance of an acceleration burst test.

Figure 4:
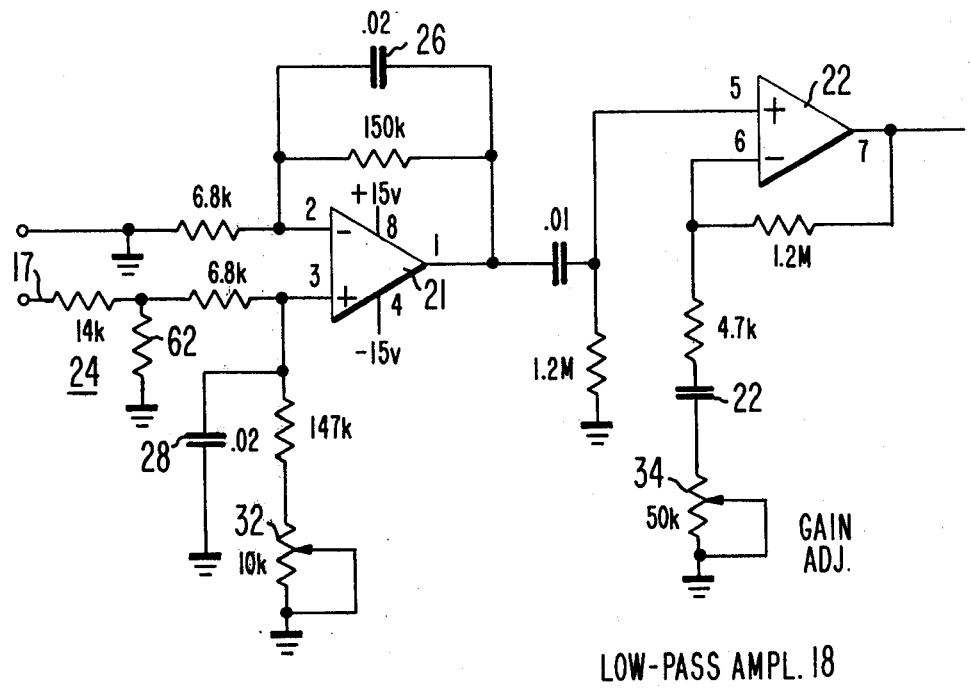
FIG. 4 is a circuit diagram of the low-pass amplifier in the system of FIG. 1.

The signal from transducer amplifier 16 in FIG. 1 is applied over line 17 to a low-pass amplifier 18, which is shown in detail in FIG. 4. The amplifier 18 includes two operational amplifiers 21 and 22 which may be constituted by a Motorola Corporation MC1558 integrated circuit unit. An attenuator 24 is provided at the input because the amplifier has more gain than needed when used with the Validyne ampliier 16. Capacitors 26 and 28 provide attenuation of undesired signal frequency components above about 500 Hz. Potentiometers 32 and 34 provide adjustment of offset and common mode rejection ratio, and gain, respectively.

Figure 5:
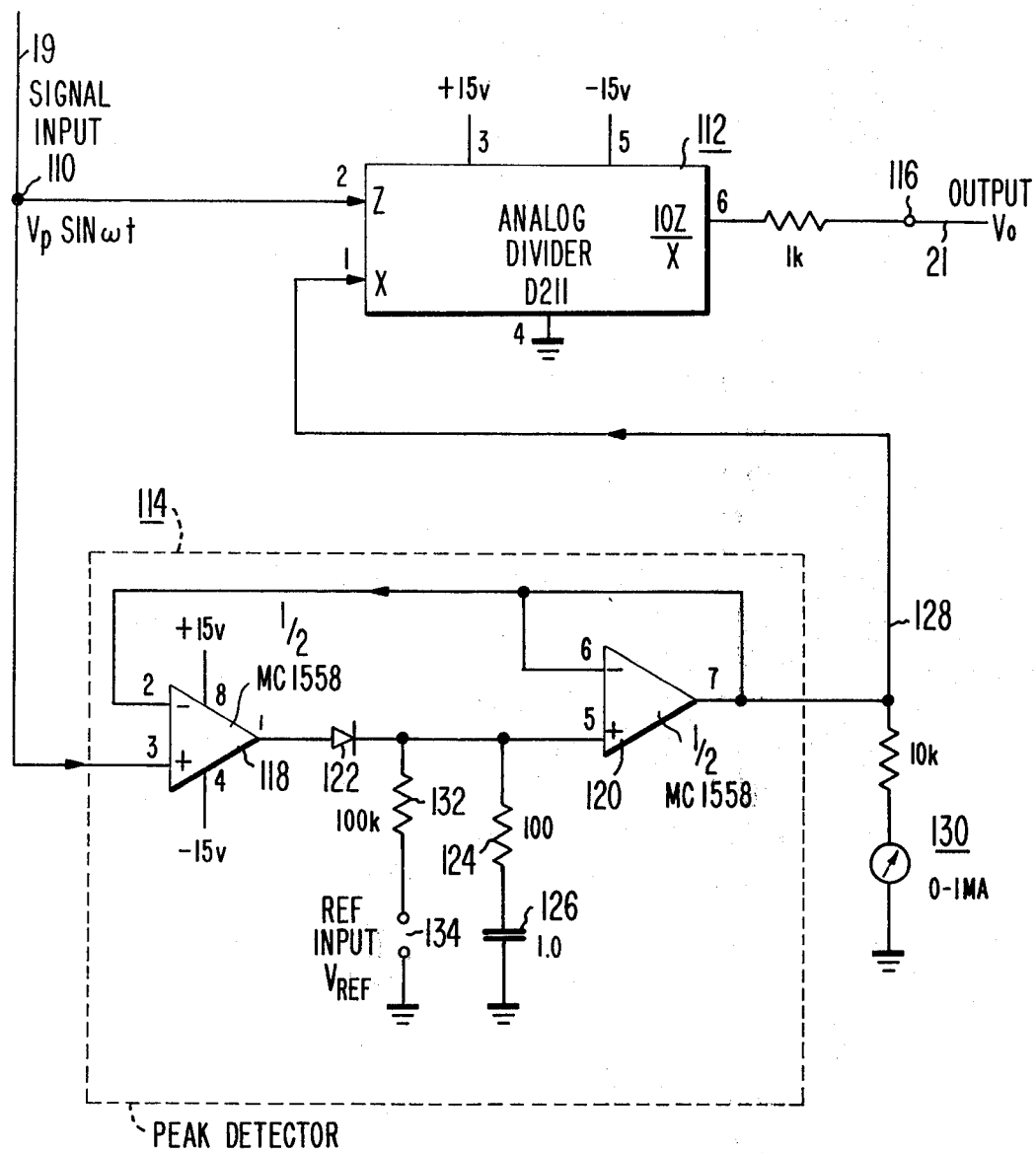
FIG. 5 is a circuit diagram of the AGC circuit included in the system of FIG. 1.

The output of low-pass amplifier 18 in FIG. 1 is applied over line 19 to the input of an automatic gain control (AGC) circuit 20, which is shown in greater detail in FIG. 5.

Description of AGC Amplifier

Referring to FIG. 5, there is shown an automatic gain control circuit consisting of an a-c input signal terminal 110 connected to the numerator input Z of an analog divider 112, and connected through a peak detector 114 to the denominator input X of the divider, and an output terminal 116 coupled to the quotient output 10Z/X of the divider. The analog divider 112 may be an Intronics, Inc. type D211 wide dynamic range analog divider. The output is equal to ten times the quotient of the numerator Z divided by the denominator X.

The peak detector 114 may include the two operational amplifiers 118 and 120 of a Motorola Corp. operational amplifier unit MC1558. The operational amplifiers are connected with a diode 122, a resistor 124 and a capacitor 126 to form a noninverting peak detector. The operational amplifier 120 is connected as a unity gain follower inside the overall feedback loop. Every voltage of an a-c signal applied to the + input of operational amplifier 118 causes a corresponding charge to be added to the charge or voltage on capacitor 126. This voltage is transmitted over lead 128 to the denominator input X of the analog divider 112. A meter circuit 130 is provided for use if necessary when making adjustments in the circuit for a particular input signal applied to input terminal 110. Further information about the construction of noninverting peak detector circuits may be found on pages 355,356 of "Operational Amplifiers—Design and Applications" edited by Tobey, Graeme and Huelsman, and published by McGraw-Hill in 1971.

The peak detector 114 includes a resistor 132 and terminals 134 for the application of a d-c reference voltage from a source not shown. A reference voltage amplitude is selected so that all levels of input signal above a desired threshold (equal to the reference voltage) result in a constant-amplitude output signal at the output terminal 116.

Operation of AGC Amplifier

The input a-c signal applied to terminal 110 and to numerator input Z of divider 112 may be described by the formula:

$$V_p \sin wt \qquad (1)$$

where $V_p$ is the peak voltage. This signal is also applied to the peak detector, the output of which is equal to the voltage $V_p$ when the input signal peak voltage is greater than $V_{ref}$. This voltage $V_p$ is applied to the denominator input X of the analog divider 112. The output $V_o$ at 116 from the divider is then:

$$V_o = \frac{10 V_p \sin wt}{V_p} = 10 \sin wt \qquad (2)$$

The output remains at the constant value of 10 sin wt regardless of variations in the value of the input peak voltage $V_p$.

On the other hand, if the peak voltage $V_p$ of the input signal is less than the reference voltage $V_{ref}$, the output at 128 from the peak detector 114 is a voltage equal to $V_{ref}$. Then the output $V_0$ at 116 from the analog divider 112 is:

$$V_o = \frac{10 V_p \sin wt}{V_{ref}} \qquad (3)$$

which is a straight line relationship of increasing voltage as $V_p$ increases, because $V_{ref}$ is constant.

Figure 6:
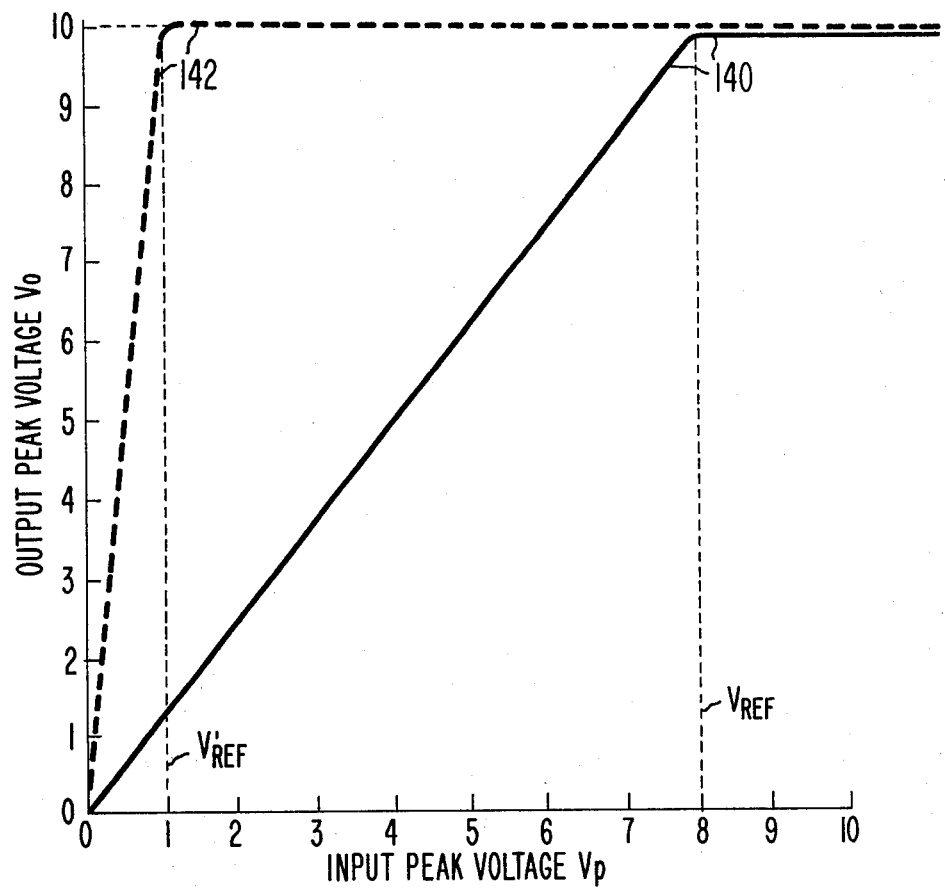
FIG. 6 is an input-output characteristic chart which will be referred to in describing the operation of the AGC circuit.

FIG. 6 shows at 140 how the output peak voltage $V_o$ varies in response to input peak voltage when the reference voltage $V_{ref}$ is equal to 8 volts. The output is constant when the input peak voltage exceeds 8 volts. The output peak voltage varies linearly with input peak voltage when input peak voltage is less than 8 volts.

The dashed curve 142 shows how the output peak voltage $V_0$ voltage varies in response to input peak voltage when the reference voltage $V_{ref}$ is equal to 1 volt. The output is constant when the input peak voltage exceeds 1 volt. It is thus seen that any desired dynamic range of input signal amplitudes over which a constant output signal amplitude is provided can be established by merely employing a reference voltage $V_{ref}$ of appropriate value.

Figure 7:
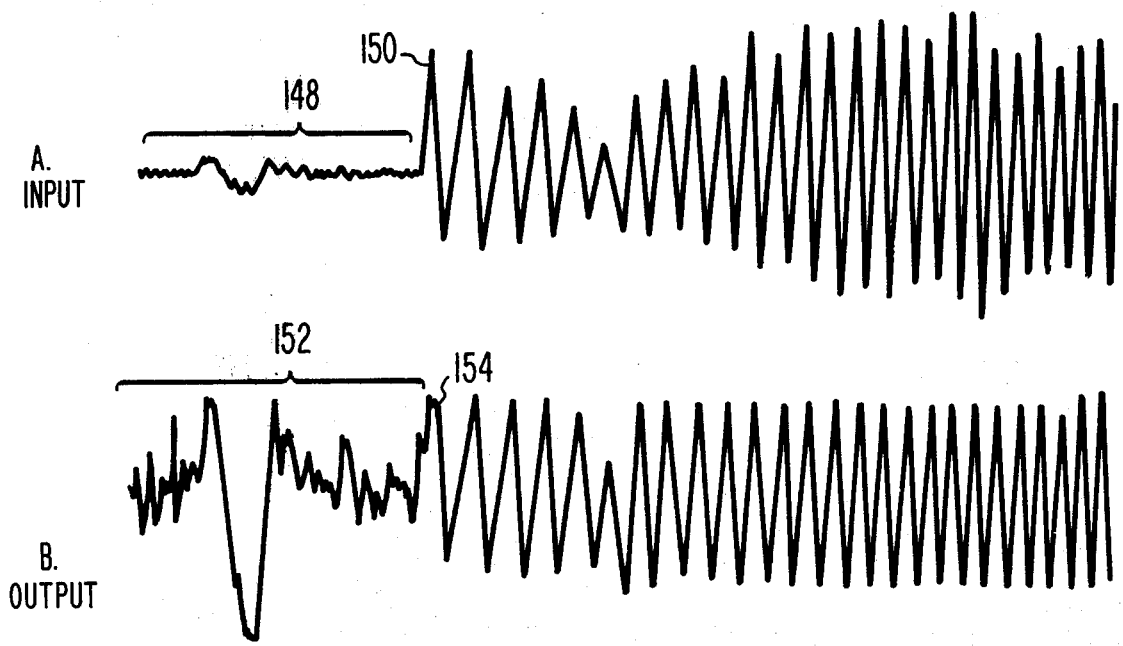
FIG. 7 is an input-output waveform chart which will be referred to in describing the operation of the AGC circuit.

FIG. 7 illustrates how rapidly the automatic gain control circuit operates to limit the output signal amplitude when the input signal amplitude suddenly increases. The input wave A, having a frequency of about 100 Hz, has an initial low amplitude 148 which suddenly increases during a positive half cycle 150 of the input wave. The output wave B has an initial period 152 during which the input wave is highly amplified, and then the amplification of the input half cycle 150 is immediately limited in the output wave at 154 to the predetermined gain controlled amplitude. Following cycles and also similarly limited. The wave shown by way of example increases in frequency because it is generated during an acceleration burst test in an apparatus for measuring the power of an internal combustion engine.

Description of the Tracking Filter

Figure 8:
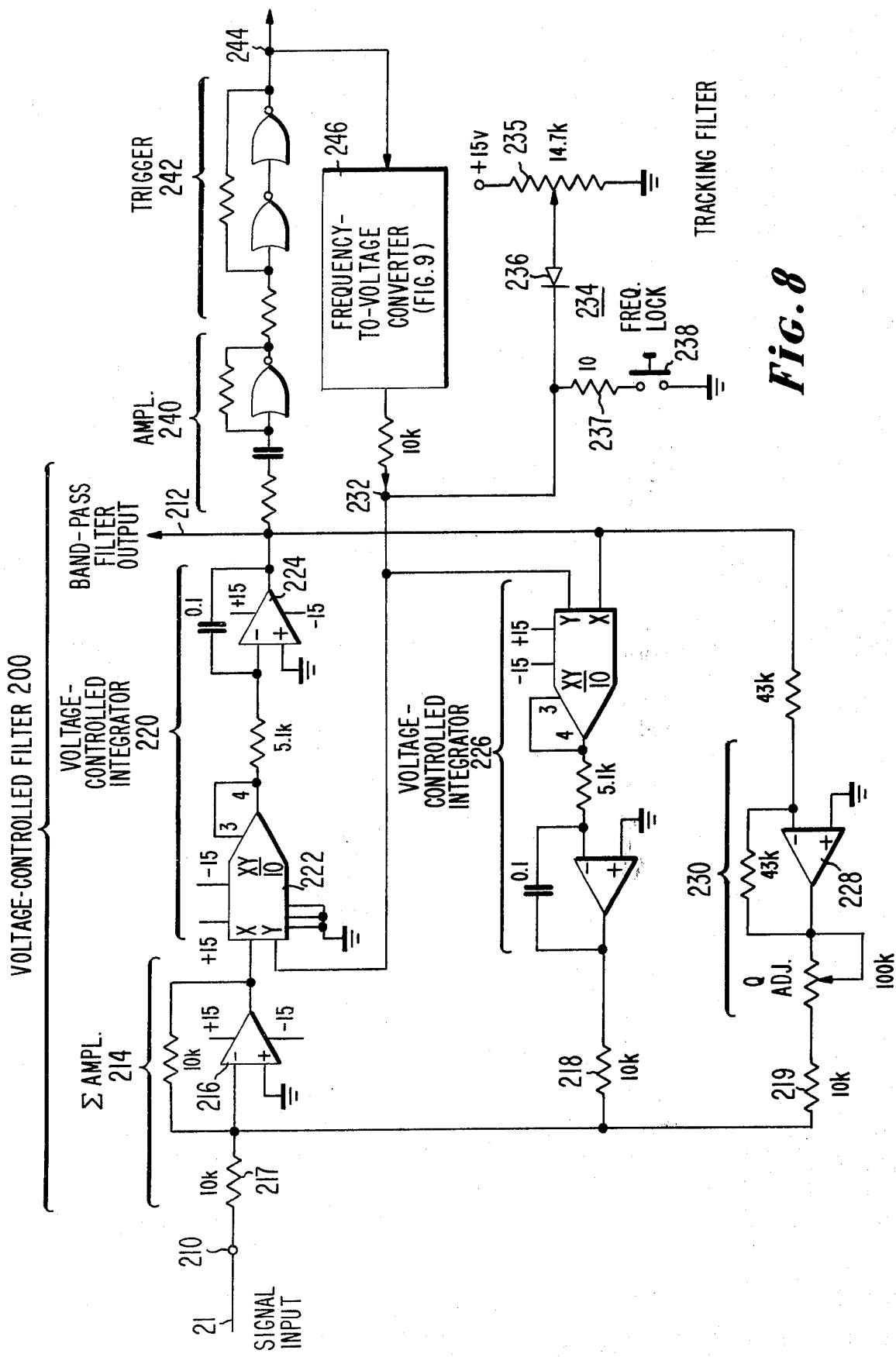
FIG. 8 is a system diagram of a tracking filter suitable for use in the system of FIG. 1.

The output of the AGC amplifier 20 in FIG. 1 is applied over line 21 to the input of a tracking filter 30, which includes a voltage-controlled filter 200, a pulse wave trigger 240, 242 and a frequency-to-voltage converter 246. The tracking filter is shown in FIG. 8 to include a voltage-controlled filter 200 having a signal input terminal 210 and a signal output terminal 212. The input terminal 210 is connected to a summation amplifier 214 consisting of an operational amplifier 216 connected as an inverting gain amplifier having summation input resistors 217, 218 and 219. Inverting gain amplifiers are described at page 172 of "Operational Amplifiers-Design and Applications" edited by Tobey, Graeme and Huelsman and published by McGraw-Hill in 1971. The operational amplifier 216, and other operational amplifiers in FIG. 1 may be constituted by one-half of a Motorola MC1458 operational amplifier unit.

The output of summation amplifier 214 is connected to an input X of a voltage-controlled integrator 220 including a multiplier 222, and an operational amplifier 224 connected as an integrator in a manner described at page 212 of the above-mentioned book. The multiplier 222 may be a Type AD532 manufactured by Analog Devices, and may be any multiplier described in pages 268–281 of the above-mentioned book. The output 212 of the integrator is connected in a feedback path consisting of a voltage-controlled integrator 226 like integrator 220 and in a parallel feedback path consisting of an operational amplifier 228 connected as an inverting gain amplifier 230.

The Y inputs of the multipliers in voltage-controlled integrators 220 and 226 are connected to a frequency control terminal 232 to which a control voltage is supplied to control the frequency pass band of the voltage-controlled filter 200. The control voltage is initially provided by a circuit 234 at a low value to cause the filter to have a low frequency pass band corresponding to the idle speed of the engine under test. The circuit 234 provides a low voltage 232 by current flowing from the +15v. terminal through potentiometer 235, diode 236, resistor 237 and switch 238. If the frequency of the input signal applied to terminal 210 increases, a higher control voltage is supplied to terminal 232 by the action of a class A amplifier 240, a trigger circuit with hysteresis or limiting amplifier 242 producing a square wave at 244, and a frequency-to-voltage converter 246. The amplifier elements may be contained in RCA CD4001AE integrated circuit units.

The total transfer function of the voltage-controlled filter shown in FIG. 8 is:

$$H_{(s)} = \frac{\frac{KVS}{10RCQ}}{S^2 + \frac{VS}{10RCQ} + \left(\frac{V}{10RC}\right)^2}$$

where
 $S$ = LaPlace operator
 $Q$ = Center frequency/Bandwidth
 $K$ = Gain at center frequency
 $RC$ = 1/Natural frequency
 $V$ = Control voltage applied at Terminal 232

Description of Frequency-to-Voltage Converter

Figure 9:
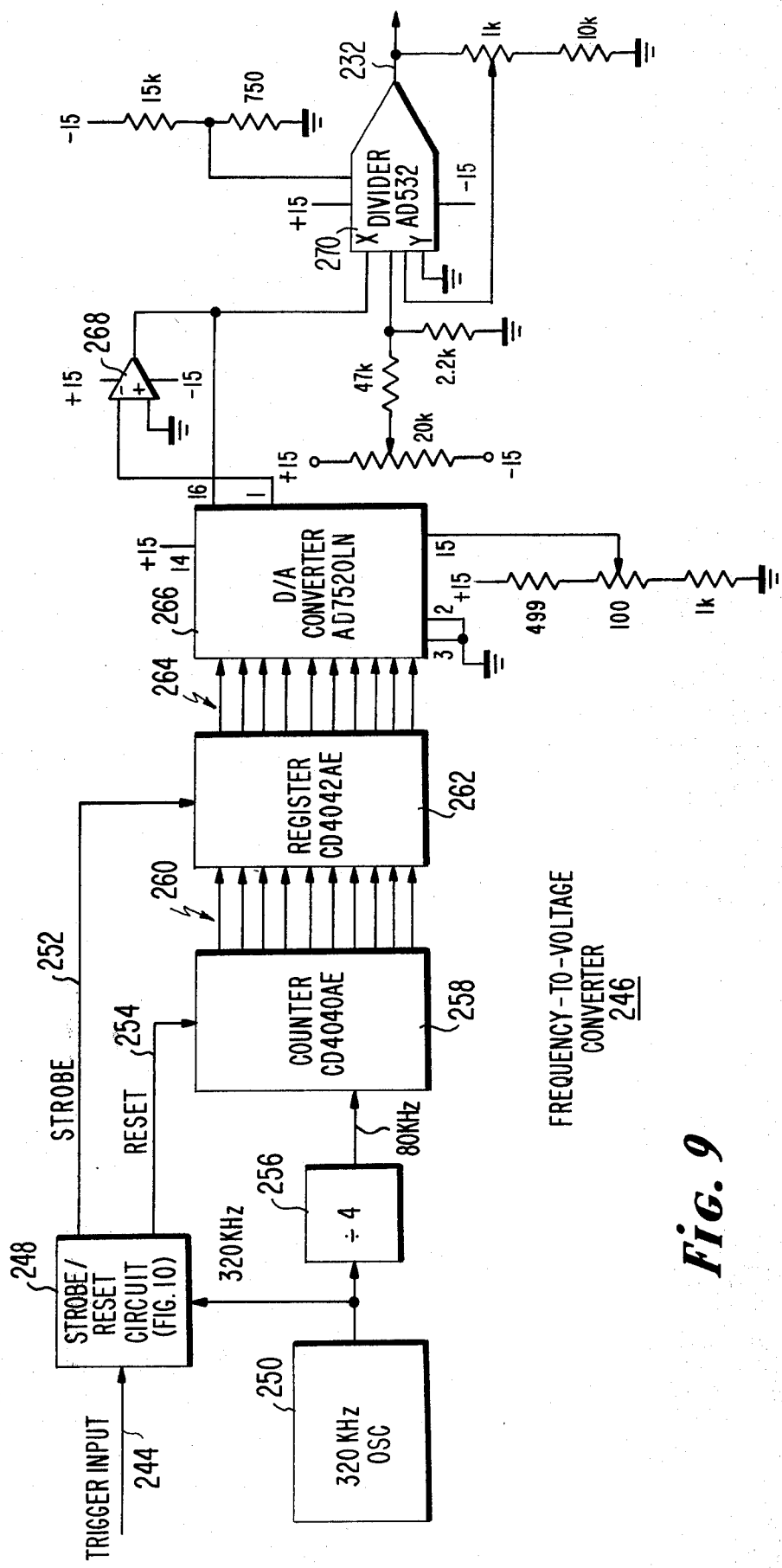
FIG. 9 is a block diagram of a frequency-to-voltage converter included in the tracking filter of FIG. 8.
Figure 10:
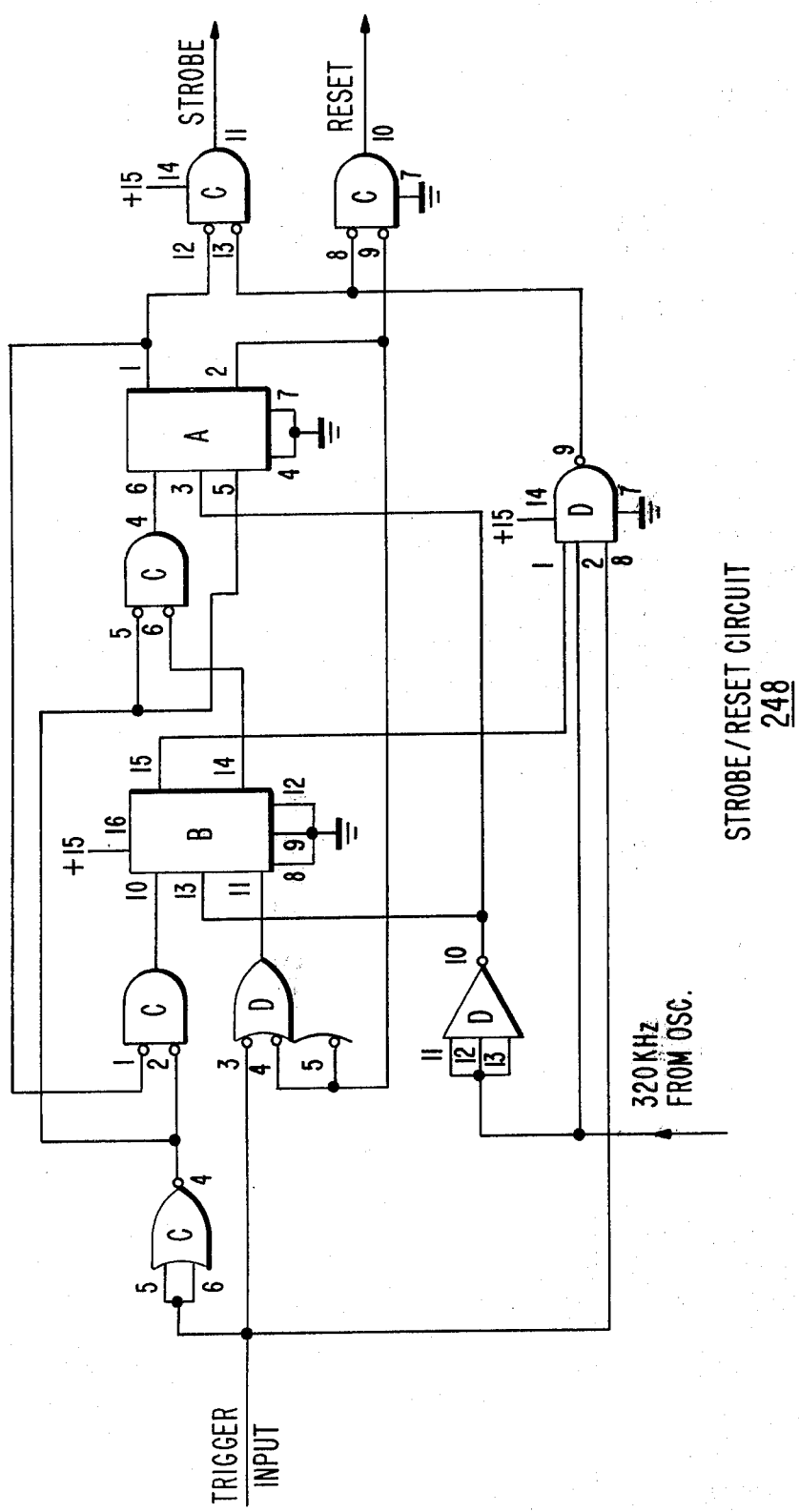
FIG. 10 is a circuit diagram of a strobe/reset circuit included in the frequency-to-voltage converter of FIG. 9.

The frequency-to-voltage converter 246 in FIG. 8 is shown in detail in FIG. 9. The input 244 of the converter is connected to a strobe/reset circuit 248 which also receives a 320 KHz square wave from an oscillator 250. The circuit 248 produces a strobe output pulse at 252, and shortly thereafter a reset output pulse at 254. The strobe and reset pulses occur once per cycle of the trigger input, which may have a repetition rate of a few hundred pulses or cycles per second. The strobe and reset pulses each have the duration of a half cycle of the square wave from the 320 KHz oscillator. The strobe/reset circuit may have a detailed circuit diagram as shown in FIG. 10, where JK flip-flops A and B are an RCA CD4027AE unit, gates C are an RCA CD4001AE unit and gates D are an RCA CD4023AE unit.

The frequency-to-voltage converter of FIG. 9 includes a divide-by-four circuit 256 which divides the 320 KHz square wave from oscillator 250 to a 80 KHz pulse wave which is applied to the input of a counter 258. The divider 256 may be constituted by an RCA CD4027AE unit wired in a conventional manner.

The counter 258 counts the 80 KHz input pulses until it is reset by a reset pulse over line 254 from circuit 248. The counter, which may be an RCA CD4040AE integrated circuit unit, has ten output lines 260 over which the count is transferred to a storage register 262 when the register is gated by a strobe pulse over line 252 from the circuit 248. The register 262 may consist of three RCA CD4042AE integrated circuit units. The register 262 has ten output lines 264 connected to ten inputs of a digital-to-analog converter 266 such as the Analog Devices AD750LN integrated circuit unit. The analog output of the converter 266 is applied through an operational amplifier 268 to the X input of an analog divider 270 such as the Intronics Inc. D211 unit, or the Analog Devices AD532 unit where the reciprocal is taken. The output at 232 from the divider is a control voltage which varies linearly with the frequency or repetition rate of the trigger wave applied at 244 to the input of the frequency-to-voltage converter.

Operation of Frequency-to-Voltage Converter

The trigger input at 244 is a pulse wave having a frequency equal to the center frequency passed by the tracking filter of FIG. 8. The time period between two successive pulses of the trigger pulse wave is measured by counting in counter 258 and storing in register 262 the number of cycles of the 80 KHz wave which occur between the two successive pulses. The stored digital count is translated in digital-to-analog converter 266 to a corresponding time-representing voltage having an amplitude in accordance with the period of the trigger pulse wave. The divider or inverter 270 translates the time-representing voltage to a corresponding frequency-representing voltage corresponding with the frequency of the input trigger wave. The frequency-representing voltage is obtained during a single period of the trigger wave, in contrast to prior art arrangements which require a sensing of a large number of periods of a wave in order to determine its frequency, or measuring less than each successive period. The frequency-representing voltage output at 232 changes without delay as the frequency of the trigger pulse wave changes.

Operation of Tracking Filter of FIG. 8

The tracking filter in FIG. 8 includes a voltage-controlled filter 200 having a signal input terminal 210, a signal output terminal 212 and a frequency control terminal 232 to which a control voltage is applied to control the frequency pass band of the filter. A suitable minimum control voltage is applied to terminal 232 from initializing circuit 234 to make the frequency pass band of the filter encompass the frequency of a minimum-frequency input signal, being applied to input terminal 210, which it is desired to lock on to or track. This is accomplished by closing the switch 238 while the potentiometer 235 is at an appropriate setting. The frequency-to-voltage converter 246 is also adjusted to supply the same minimum control voltage to the terminal 232. When the switch 238 is opened, the control voltage applied to control terminal 232 is solely determined by the feedback loop including amplifier 240, trigger 242 and frequency-to-voltage converter 246.

If the frequency of the signal applied to input terminal 210, and passed to output terminal 212, increases slightly, the control voltage produced by amplifier 240, trigger 242 and converter 246 also increases slightly and causes the pass band frequency of the filter to increase a corresponding amount, without delay. Whenever the frequency of the input signal changes, the frequency pass band of the filter immediately changes to track the changing frequency of the input signal. The tracking filter is capable of responding very rapidly to a rapid change of input signal frequency because of the digital techniques employed in the frequency-to-voltage converter 246 to measure the period of each and every cycle of the signal from the filter and to then generate corresponding frequency-representing correction voltages for the voltage-controlled filter.

Referring now to FIG. 1, the sine wave output at 212 from the filter 30 is applied to a frequency-speed indicator 40, which may be any commercially-available frequency meter having a scale or display calibrated in a unit of speed, such as revolutions per minute (RPM), instead of or in addition to frequency.

The square trigger wave output at 244 from the tracking filter 30 is applied to a computer 50 which may be any commercially-available minicomputer programmed to utilize the speed-indicating trigger wave. The computer may be programmed to compute the power of the internal combustion engine during an acceleration burst test.

Operation of the Tachometer System of FIG. 1

The pressure transducer 10 and tube 12 may be mounted at the end of a hand-held stick, so that an operator can conveniently stand and poke the end of the tube 12 about three inches into the exhaust pipe 14 of an internal combustion engine (not shown) while the engine is operated at idle speed. The pressure pulsations produce a corresponding electrical wave which is amplified in transducer amplifier 16 and appears as shown in FIG. 2a. The low pass amplifier 18 and the AGC amplifier translate the signal to a wave of constant peak amplitude as shown by FIG. 2b. The constant-amplitude wave is applied to the tracking filter 30 having a narrow frequency pass band which passes a prominent component frequency that varies directly with engine speed, and which rejects or attenuates other disturbing frequency components. The pass band frequency of tracking filter 30 is initially established by momentarily closing switch 238 in FIG. 8 while the engine is operated at idle speed. The output at 212 is therefore a relatively constant-amplitude signal which is a relatively clean sine wave.

If the tachometer is used in the performance of an acceleration burst test, the accelerator is then floored, causing the engine to accelerate rapidly to a maximum governed speed. As the speed rapidly increases, the pressure pulsations increase in frequency and the tracking filter rapidly increases the frequency of its pass band in precisely the right amount to pass the electrical signal of increasing frequency. The relatively pure, clean output signal is obtained primarily because the tracking filter 30 is constructed to have a very fast response to changes in input signal frequency. The clean output signal is translated to a pulse wave by trigger 240, 242 and is applied to the computer 50. The pulse wave may be divided in frequency by means not shown and appear as represented in FIG. 2c.

The computer continuously computes the changing speed of the engine and measures the time taken by the engine in going from a predetermined low speed to a predetermined high speed. This time period is a measure of the full-load, full-throttle power output capability of the engine. The engine may then be turned off and the deceleration rate computed. Using solely the information thus obtained from the pressure transducer in the exhaust pipe, the computer can compute and display indicated torque and horsepower, friction torque and horsepower and brake torque and horsepower— all without the making of a mechanical or electrical connection to the engine.

What is claimed is:
1. A tachometer for internal combustion engines, comprising,
  a transducer for translating a pressure waveform emitted by the engine to a corresponding electrical signal having a prominent frequency component which varies in frequency in direct proportion with engine speed,
  an amplifier for said signal including automatic gain control means, and
  a tracking filter receptive to the output of said amplifier and having a frequency pass band which tracks and passes said prominent frequency component as the frequency changes due to changes in engine speed,
  whereby the output of said tracking filter is an electrical wave having a frequency representing engine speed.
2. A tachometer according to claim 1 wherein said transducer is mounted on a tube adapted to have one end thereof inserted in the end of the exhaust pipe of an engine.
3. A tachometer according to claim 1 wherein said transducer is a variable reluctance pressure transducer.
4. A tachometer according to claim 1 wherein said automatic gain control means includes
  an analog divider having a numerator input terminal receptive to the input signal, and having a quotient output terminal providing a gain-controlled output signal, and a peak detector coupled from said quotient output terminal to the divisor input terminal of said divider.

5. A tachometer according to claim 4 wherein said peak detector includes means to clamp the output of the peak detector at a reference voltage when the input signal is less than the reference voltage.

6. A tachometer according to claim 1 wherein said tracking filter includes a voltage-controlled filter, a trigger circuit connected to translate the sine wave passed through said filter to a pulse wave, a converter receptive to said pulse wave and operative repeatedly to translate the period between successive pulses to a frequency-representing voltage, and means to apply said frequency-representing voltage to the frequency control terminal of said voltage-controlled filter.

7. A tachometer according to claim 6 wherein said converter includes a constant-frequency oscillator, a counter coupled to count the cycles from the oscillator during each interval between successive pulses from the trigger circuit, and a digital-to-analog converter and an inverter to translate each time-representing count from the counter to a frequency-representing voltage.

8. A tachometer according to claim 1, and in addition means coupled to the output of said tracking filter to translate the frequency signal to an indication of speed in a unit such as revolutions per minute.

* * * * *